Patented Dec. 12, 1950

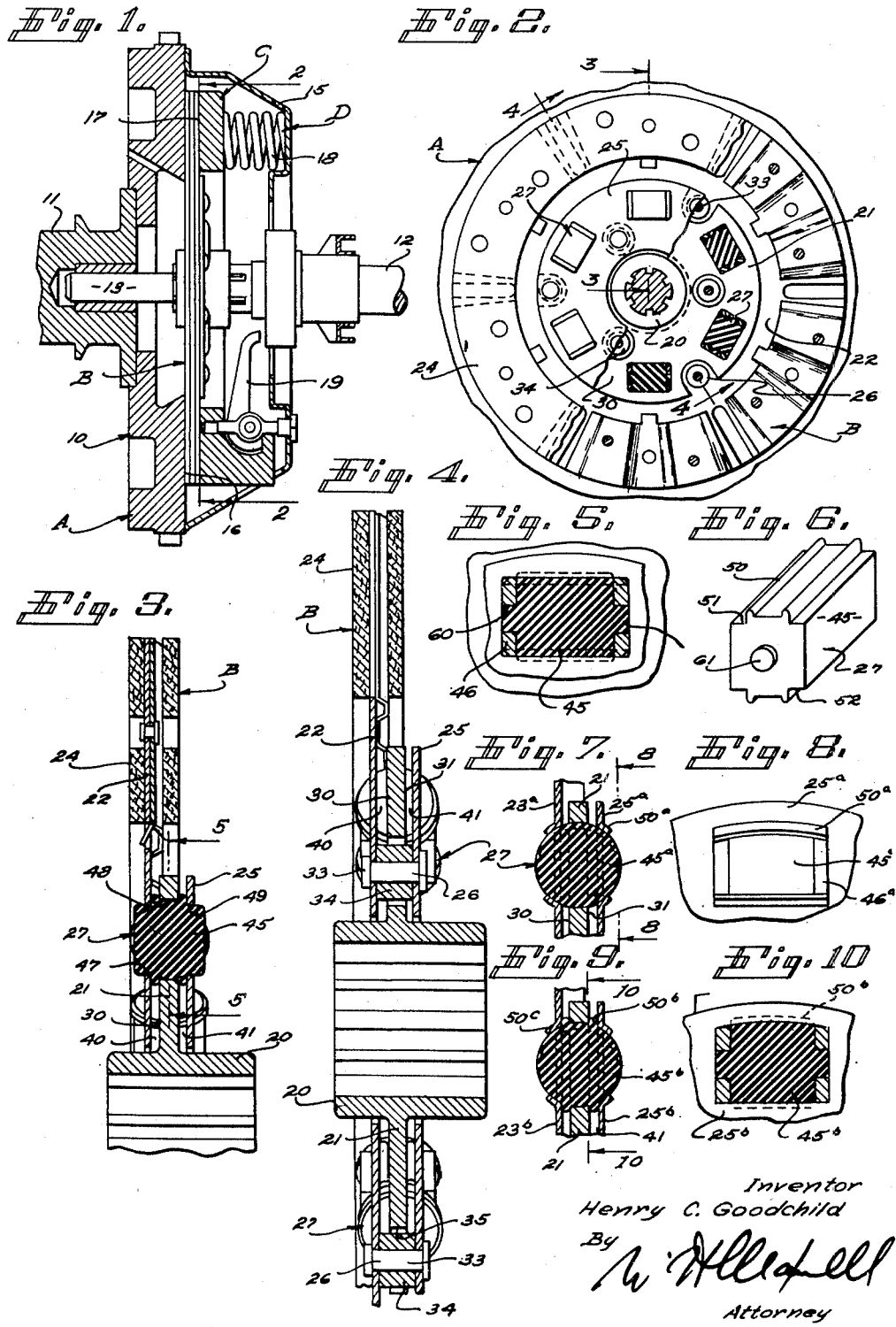

2,533,789

UNITED STATES PATENT OFFICE 2,533,789

CUSHION FOR CLUTCH PLATES

Henry C. Goodchild, Los Angeles, Calif.

Application August 19, 1948, Serial No. 45,193

4 Claims. (Cl. 64—27)

This invention has to do with a cushion for clutch plates and it is a general object of the invention to provide an improved, simplified, cushion construction for clutches of the type used in connection with internal combustion engines and the like.

Clutches are used in various situations where power is transmitted, it being common to use them in connection with internal combustion engines as for instance in motor vehicles, where they form a power connection between the engine and the driving wheels. It is desirable, in clutches of the character referred to, that there be cushioning elements to soften the clutch action. Various clutch constructions have been proposed employing cushioning springs and rubber elements are disclosed and claimed in my copending application entitled "Plate Type Clutch," Serial No. 785,975, filed November 14, 1947.

The invention which is subject of this application is concerned with cushion elements for incorporation in clutch constructions and it is a general object of the invention to provide an improved cushion of the general form and type set forth in my said copending application.

A further object of the present invention is to provide a clutch cushion of simple, inexpensive construction and which is such that it may be readily snapped or pressed into place and will maintain itself in operating position when once arranged in place.

Another object of the present invention is to provide a clutch cushion element of the general character referred to including a cushion body of rubber, or the like, which holds bearing plates at its ends so that working of the clutch does not result in cutting or deterioration of the rubber.

A further object of the present invention is to provide a cushion element for clutches which is simple in form and application, making it inexpensive and practical to use.

The various objects and features of my invention will be fully understood from the following detailed description of typical preferred forms and applications of my invention, throughout which description reference is made to the accompanying drawings, in which:

Fig. 1 is a sectional view of a clutch located between an engine and a propeller shaft, which clutch involves cushion elements provided by the present invention. Fig. 2 is a transverse sectional view of the structure shown in Fig. 1, being a view taken in the general direction indicated in line 2—2 of Fig. 1, certain of the parts being shown broken away to show in section. Fig. 3 is an enlarged detailed sectional view taken as indicated by line 3—3 on Fig. 1, being a view taken through one of the cushion elements embodying the present invention. Fig. 4 is an enlarged detailed sectional view taken as indicated by line 4—4 on Fig. 2. Fig. 5 is a detailed sectional view taken as indicated by line 5—5 on Fig. 3 and Fig. 6 is a perspective view of a cushion body provided by the present invention. Fig. 7 is a view similar to a portion of Fig. 3, showing a modified form of construction. Fig. 8 is a view taken as indicated by line 8—8 on Fig. 7. Fig. 9 is a view similar to Fig. 7 showing another form of construction, and Fig. 10 is a sectional view taken as indicated by line 10—10 on Fig. 9.

The clutch illustrated in the drawings and embodying the cushion elements provided by the present invention is of the type commonly employed in motor vehicles and includes, generally, a drive element A, a friction element B, a pressure element C and operating means D for the pressure element.

The drive element A is shown as the flywheel 10 of an engine and is fixed on the engine shaft 11. The friction element B is shown as carried by or as having driving engagement with a propeller shaft 12 which has a forward end extension 13 supported in the end of the engine shaft 11.

The pressure element is shown as a flat plate-like structure carried by the flywheel 10 through a suitable cage 15 and cooperating with the flywheel 10 through the friction element B.

The structure shown being of conventional form, the flywheel 10 has a flat finished face 16 to be engaged by the friction element B and the pressure element C has a flat finished face 17 opposing the face 16. The friction element has a flat plate-like portion arranged between the faces 16 and 17. The actuating means D operates the pressure element C toward and away from the flywheel to grip or release the friction element as desired. The means D is shown as including a plurality of springs 18 supported by the cage 15 and normally yieldingly urging the pressure element toward the flywheel so that the friction element is normally gripped between the pressure element and flywheel. The means D further includes one or more elements or release mechanism 19 operable to shift the pressure element away from the flywheel against the resistance of the springs 18.

The friction element B of the clutch includes features of construction or cushion elements embodying the present invention. The particular element B shown in the drawings involves, generally, a hub 20, a radial flange 21 projecting from the hub, a shoe plate 22 having an inner portion 23 at one side of the flange 21, friction shoes 24 carried by the plate 22, a supplemental plate 25 located at the opposite side of flange 21 and means 26 coupling the plate 25 with the plate portion 23.

A plurality of cushion units 27 embodying the present invention is combined with the elements just described so that a cushioned driving action is obtained between the shoes 24 and the hub 20. The shoes 24 are friction elements mounted at opposite sides of the plate 22 where it occurs between the faces 16 and 17, and in accordance with the present invention the shoes may be of any desired form or construction by which a secure or positive driving engagement may be established frictionally between the engine shaft 11 and the propeller shaft 12. In the drawings the friction shoes 24 are shown mounted on or applied to the plate 22 in one manner, whereas it will be apparent that they may be applied to the plate in any desired manner, as for instance, in the manner shown in the aforementioned copending application or in any other suitable manner.

The inner portion 23 of the shoe plate 22 occurs opposite the side 30 of flange 21 and in the particular case illustrated the shoe carrying portion of plate 21 is integrally joined with and projects outward beyond the portion 23 of the plate. The supplemental plate 25 is opposite the side 31 of the flange 21 and is of limited size or diameter, being substantially coextensive with the flange 21 as clearly shown throughout the drawings. The means 26 connecting the supplemental plate 25 and the plate portion 23 includes a plurality of circumferentially spaced fasteners 33 that extend between or join the plate portion 23 and the plate 25. It is preferred that spacers 34 be located between the plate portion 23 and the plate 25 where the fasteners 33 occur and that the spacers 34 be located to extend through openings 35 in the flange 21. The spacers 34 fit the openings 35 with substantial clearance allowing for limited relative movement between the plate 22 and the flange 21 which is on the hub 20. The fasteners 33 are preferably rivets or the like which serve to join the plate 25 and the plate portion 23 rigidly together and the spacers 34 are preferably such as to hold the plate portion 23 a substantial distance away from the side 30 of flange 21 so that there is a space 40 between the plate portion 23 and the flange while the plate 25 is held away from the side 31 of the flange 21, leaving a space 41.

The cushioning means provided by the present invention provides a plurality of like cushioning units 27 which are circumferentially spaced around the structure just described. Each cushioning unit involves, generally, a cushion body 45 and bearing plates 46 at the ends of the body. Openings 47, 48 and 49 are provided in the plate portion 23, the flange 21, and the plate 25, respectively, to accommodate the cushion unit.

The body 45 of the cushion unit is preferably formed of rubber or rubber-like material and in its preferred form it is an elongate body of rubber which may be substantially rectangular in cross sectional configuration as shown in Figs. 1 to 6, of the drawings. In practice I employ a rubber-like composition which is not affected by oil, or the like, such material being commonly referred to as "neoprene." The openings 47, 48 and 49 in the clutch parts that accommodate the cushion are elongate openings corresponding, generally, in size and shape with the cushion unit 27 and they are so disposed as to extend tangentially of circles concentric with the axis of the structure. It is preferred, in practice, that the openings 47, 48 and 49 be so proportioned as to snugly receive the cushion body 45 with the pressure plates in place at its ends.

In accordance with the present invention one or more retainer ribs 50 are provided on the cushion body 45, the ribs being so arranged and related as to cooperate with the clutch parts in order that the cushion body be maintained in operating position when once applied to the clutch parts. In the particular form of the invention illustrated there are two ribs 50 projecting from the outermost side 51 of the cushion body and two ribs 50 projecting from the inner side 52 of the cushion body. The ribs 50 extend lengthwise of the cushion body 45 and are spaced apart to enter or project into the spaces 40 and 41 that occur at opposite sides of the flange 21. In practice the ribs 50 may be of any desired extent lengthwise of the body although it is preferred, ordinarily, that they be extended from one end to the other of the body and it will be apparent that they can be made of any desired height or to project in any desired manner. In practice the rubber employed in the cushion body 45 is rather firm and therefore retainer ribs 50 of limited size serve to effectively maintain the cushion unit in operating position.

In accordance with the broader principles of the present invention, the pressure plates 46 that occur at the ends of the cushion body 45 may be maintained in position in any suitable manner. In the drawings the pressure plates are shown mounted on or secured to the ends of the cushion body 45 so that they combine with the cushion body to form a unit that can be conveniently handled relative to the other parts of the clutch. In the particular case illustrated each pressure plate 46 is a round flat disc-like part with a central opening 60 and projections 61 are provided on the ends of the cushion body 45 to enter the openings 60 in such manner as to center the plates relative to the body 45 and to hold the plates on the body in the desired manner.

With the construction just described the cushion units 27 are exceedingly simple in form and construction, making them inexpensive and they are very easily handled and applied to the clutch construction. It will be apparent that the cushion units may be arranged in operating position by being forced or thrust into place from either side of the clutch construction and when once in place with the ribs in the openings at opposite sides of the flange 21 the units are secure in the clutch. It will be apparent how the several cushion units combine to yieldingly resist rotation of the shoe plate 22 relative to the hub 20 which carries the flange 21. Further, it will be apparent that the structure is such as to allow only limited movement between the parts just mentioned. The action of the rubber cushion bodies 45 softens the clutch action and relieves the sudden shock and strain that would otherwise occur in the clutch construction upon it being engaged rapidly.

In the form of the invention illustrated in Figs. 7 and 8 of the drawings the cushion body 45ª is substantially round in cross section instead of being rectangular, as above described, and the retention of the cushion body is gained by retaining ribs or flanges 50ª on the plate parts 23ª and 25ᵃ. The ribs 50ª project outwardly to embrace or overlie the cushion body 45 and they are of such extent as to effectively maintain the body 45ª in proper working position. In this case as in the one first described pressure plates 46ª may be provided at the ends of the cushion body 45ª.

In the form of the invention shown in Figs. 9 and 10 the cushion body 45ᵇ is substantially round in cross sectional configuration like that shown in Fig. 7 and retaining ribs 50ᵇ are provided on the body 45ᵇ similar to those shown in Figs. 3 and 6, while retaining ribs 50ᶜ are provided on the plate parts 23ᵇ and 25ᵇ in the manner similar to that shown in Fig. 7.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A clutch cushion engageable between relatively movable clutch parts to operate under compression including, a solid elongate body of rubber-like cushioning material having a plurality of retaining projections extending continuously the length of the body and engageable between the clutch parts, and metal pressure plates engaging the ends of the body and engageable with the clutch parts.

2. A clutch cushion engageable between relatively movable clutch parts to operate under compression including, a solid elongate body of rubber-like cushioning material having a plurality of retaining projections at opposite sides of the body and extending continuously the length of the body and engageable between the clutch parts, metal pressure plates engaging the ends of the body and engageable with the clutch parts, and means retaining the plates on the ends of the body.

3. A clutch cushion engageable between relatively movable clutch parts to operate under compression including, a solid elongate body of rubber-like cushioning material having a plurality of retaining projections extending continuously the length of the body and engageable between the clutch parts, apertured metal pressure plates engaging the ends of the body and engageable with the clutch parts, and projections on the body engaged in the apertures of the plates and holding the plates on the ends of the body.

4. A clutch cushion engageable between relatively movable clutch parts to operate under compression including, a solid elongate body of rubber-like cushioning material having a plurality of parallel retaining projections on each of two opposite sides of the body, the projections extending continuously the length of the body and engageable between the clutch parts, metal pressure plates engaging the ends of the body and engageable with the clutch parts, and projections on the ends of the body engaging the plates and retaining them on the ends of the body.

HENRY C. GOODCHILD.

REFERENCES CITED

The following references are of record in the file of this patent:

UNITED STATES PATENTS

| Number | Name | Date |
|---|---|---|
| 1,598,795 | Willene | Sept. 7, 1926 |
| 1,663,803 | Link | Mar. 27, 1928 |
| 1,760,492 | Hall | May 27, 1930 |
| 1,952,892 | Reed | Mar. 27, 1934 |
| 2,070,329 | Brecht | Feb. 9, 1937 |
| 2,186,305 | Orr | Jan. 9, 1940 |
| 2,222,337 | Gordon | Nov. 19, 1940 |
| 2,231,769 | Merrill | Feb. 11, 1941 |
| 2,234,443 | Macbeth | Mar. 11, 1941 |
| 2,397,642 | Blazek et al. | Apr. 2, 1946 |
| 2,437,537 | Kelleher | Mar. 9, 1948 |

FOREIGN PATENTS

| Number | Country | Date |
|---|---|---|
| 726,386 | France | May 27, 1932 |